G. BARR.
Improvement in Animal Traps.

No. 132,948. Patented Nov. 12, 1872.

Witnesses:
E. Wolff
E. Sedgwick

Inventor:
G. Barr
per
Attorneys.

UNITED STATES PATENT OFFICE.

GEORGE BARR, OF CLATSKANIE, OREGON.

IMPROVEMENT IN ANIMAL-TRAPS.

Specification forming part of Letters Patent No. 132,948, dated November 12, 1872.

*To all whom it may concern:*

Figure 1:
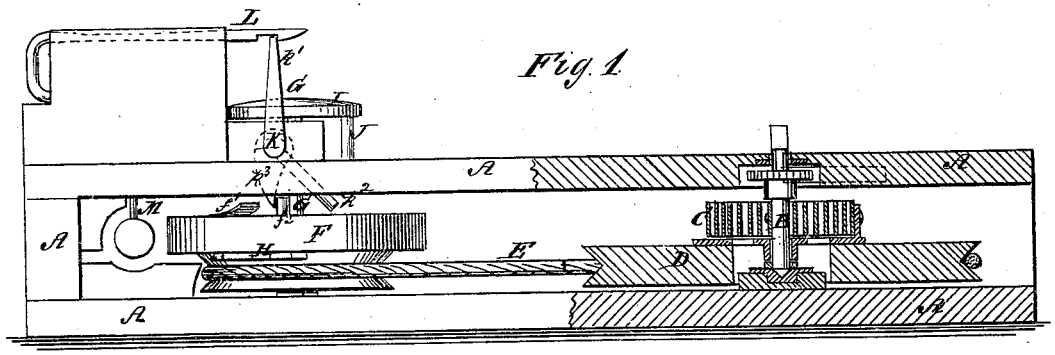
Figure 2:
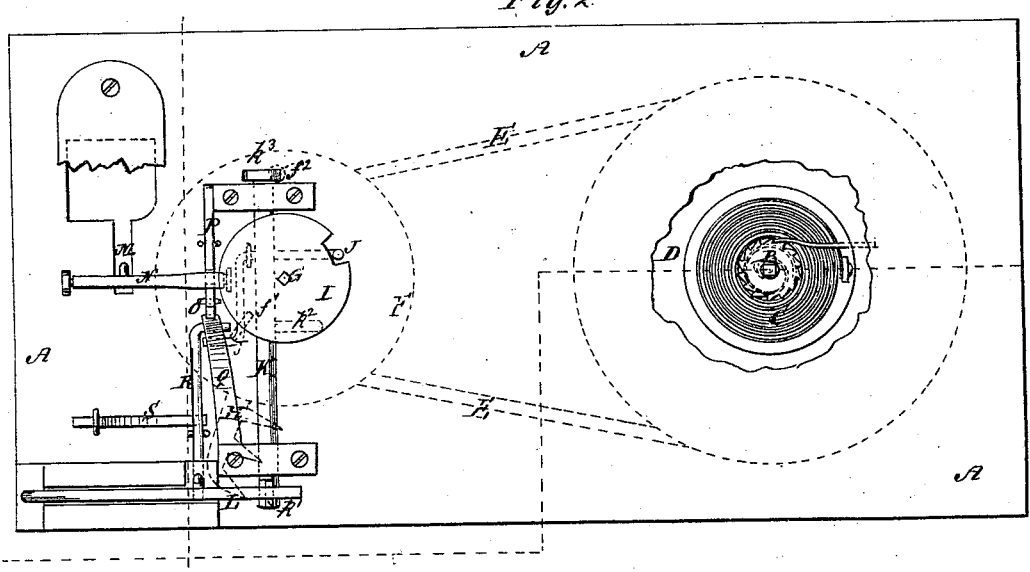
Figure 3:
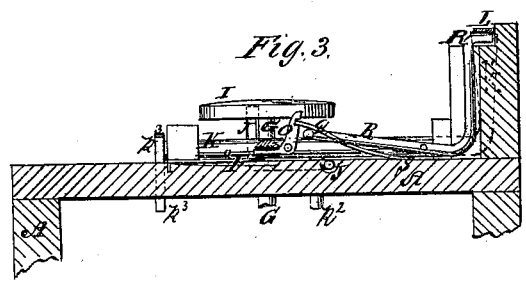

Be it known that I, GEORGE BARR, of Clatskanie, in the county of Columbia and State of Oregon, have invented a new and useful Improvement in Animal - Traps, of which the following is a specification:

Figure 1 is a front view of my improved trap, part of the case being broken away through the line $x\,x$, Fig. 2, to show the construction. Fig. 2 is a top view of the same, parts being broken away to show the construction. Fig. 3 is a detail sectional view of the same taken through the line $y\,y$, Fig. 2.

Similar letters of reference indicate corresponding parts.

My invention has for its object to furnish an improved trap for catching and destroying mice, rats, squirrels, gophers, minks, &c., and which shall be simple in construction, convenient in use, effective in operation, and self-setting; and it consists in the construction and combination of the various parts of the trap, as hereinafter more fully described.

A represents the box or case of the trap, which is made of such a size as to contain the operating mechanism, and of such a height as the size of the animal trapped for may require. To one part of the case A is pivoted a shaft, B, with which is connected a coiled spring, C, and a wheel, D, in such a way that the shaft B may be turned to wind up or coil the spring C without carrying the wheel D with it, and that the spring C, in uncoiling, must revolve the wheel D. Around the wheel D passes a band, E, which also passes around the wheel F attached to the shaft G, pivoted in the other part of the case A. To the wheel F is attached a bar or plate, H, upon the forward edge of which are formed prongs or teeth, as shown in Fig. 2. The upper end of the shaft G projects above the case A, and has a small wheel, I, attached to it. The wheel I should be secured to the shaft G by a set-screw, so that it may be moved up and down to adjust it, as may be required. In the rim of the wheel I is formed a notch to receive the upwardly-projecting end of the bent lever J, which is pivoted to the top of the case A. K is a horizontal shaft which works in bearings attached to the top of the case A. To the forward end of the shaft K is attached an upwardly-projecting arm, $K^1$, the end of which catches upon the spring-catch L attached to a support upon the top of the case A to set the trap. To the middle part of the shaft K is attached an arm, $K^2$, which projects downward through a slot in the top of the case A, into such a position that the projection or stop $f^1$ attached to the wheel F may strike against it to stop the wheel F, and thus reset the trap. To the inner end of the shaft K is attached a cam or arm, $K^3$, which, when the trap is sprung, projects downward through a slot in the top of the case A into such a position that it may be struck by the projection $f^2$ attached to the wheel F to turn the shaft K to raise the arm $K^1$ against the spring-catch L, and to lower the arm $K^2$ to receive the projection $f^1$ and stop the wheel F. M is the bait-hook, which projects downward into the narrow space between the wheel F and the end of the case A, so that the animal cannot approach the bait without being within the sweep of the pronged bar or plate H. The shank of the bait-hook M passes up through a slot in the top of the case A and is attached to a rock-shaft, N, placed upon the top of the case A and working in bearings attached to said case. The lower side of the shaft N is flattened, and rests upon the horizontal arm of the bent lever O, which is pivoted at its angle to the top of the case A, and the said horizontal arm of which is held up against the flattened surface of the shaft N by a spring, P. In the face of the vertical arm of the bent lever O is formed a slight notch to receive the end of the spring Q when the trap is set. Beneath the spring Q is placed the end of the bent lever J, hereinbefore described, and the end of the bent lever R, which is pivoted at its angle to the case A. The upper arm of the bent lever R passes up beneath the spring-catch L, so as when operated to raise the spring-catch L away from the arm $K^3$ of the shaft K and release the wheel F, allowing it to be revolved by the spring C.

By this construction, as the bait is touched the shaft N is rocked, which withdraws the lever O from the spring Q. The spring Q, when released, operates the bent lever R, which raises the catch L from the arm $K^1$ of the shaft K. This releases the wheel F and allows it to be revolved by the uncoiling of the spring C. As the wheel F revolves the pronged or toothed bar H strikes the animal, kills it, and throws it from the trap. The revolution of the wheel F carries with it the wheel I, which operates the lever J to raise the spring Q into position to enter the notch of the lever O, and at the same time allows the lever R to be withdrawn from the catch L by the spring S. As the wheel F revolves the projection $f^1$ strikes the cam $K^3$, which throws the arm $K^1$ into the catch L and lowers the arm $K^2$, ready to receive the projection $f^1$ and stop the wheel F as it completes its revolution. At the same time the outer end of the lever J rises into the notch of the wheel I, and its inner end drops away from the spring Q and the trap is set for the next animal.

Having thus described my invention, I claim as new and desire to secure by Letters Patent—

An improved animal-trap, composed of the case A, shaft, spring, and wheel B C D, band E, wheel F $f^1$ $f^2$, shaft G, pronged or toothed bar or plate H, notched wheel I, bent lever J, armed shaft K $K^1$ $K^2$ $K^3$, spring-catch L, bait-hook M, shaft N, bent lever O, spring P, spring Q, bent lever R, and spring S, said parts being constructed and operating in connecting with each other, substantially as herein shown and described, and for the purposes set forth.

GEORGE BARR.

Witnesses:
    E. G. BRYANT,
    T. S. BORDWELL.